(12) United States Patent
Gomez-Mendoza et al.

(10) Patent No.: US 10,703,273 B2
(45) Date of Patent: Jul. 7, 2020

(54) INFERRED BIRD'S EYE VIEW FOR TRAILER REVERSE ASSIST

(71) Applicant: Continental Automotive Systems, Inc., Auburn Hills, MI (US)

(72) Inventors: Rodrigo Gomez-Mendoza, Rochester Hills, MI (US); Brandon Herzog, Waterford, MI (US); Joseph Zagroba, Auburn Hills, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 103 days.

(21) Appl. No.: 16/137,178

(22) Filed: Sep. 20, 2018

(65) Prior Publication Data

US 2019/0084477 A1 Mar. 21, 2019

Related U.S. Application Data

(60) Provisional application No. 62/561,403, filed on Sep. 21, 2017.

(51) Int. Cl.
*B60R 1/00* (2006.01)
*H04N 5/232* (2006.01)
(Continued)

(52) U.S. Cl.
CPC ............... *B60R 1/00* (2013.01); *B62D 13/06* (2013.01); *B62D 15/029* (2013.01);
(Continued)

(58) Field of Classification Search
CPC .......... G06K 9/00805; G06K 9/00798; G06K 9/00791; H04N 7/183; H04N 5/272; H04N 5/23293; H04N 5/232; B60K 35/00; B60K 2370/1531; B60K 2370/777; B60K 2370/173; B60K 2370/152; B60K 2370/29; B60K 2370/27; B60K 2370/21;
(Continued)

(56) References Cited

U.S. PATENT DOCUMENTS

| | | |
|---|---|---|
| 2009/0005932 A1 | 1/2009 | Lee et al. |
| 2014/0160276 A1* | 6/2014 | Pliefke .................. B60R 1/00 348/118 |
| 2017/0050672 A1* | 2/2017 | Gieseke ................ B62D 13/06 |

OTHER PUBLICATIONS

International Search Report and Written Opinion of the International Searching Authority dated Jan. 22, 2019 for the corresponding PCT application No. PCT/US2018/0521160.

* cited by examiner

*Primary Examiner* — Howard D Brown, Jr.

(57) ABSTRACT

A method of generating an overhead view of a tow vehicle and a trailer attached to the tow vehicle is provided. The method includes receiving first sensor system data from a sensor system and determining a trailer width based on the first sensor system data. The method includes receiving a second sensor system data from the sensor system and determining a trailer length based on the sensor system data. The method includes determining a separation distance between the trailer and the vehicle based on the first and/or second sensor system data. The method includes generating an overhead image including a vehicle representation and a trailer representation based on the trailer width, the trailer length, the separation distance, the vehicle length, and the vehicle width. The method also includes transmitting instructions to display the overhead image.

20 Claims, 9 Drawing Sheets

(51) Int. Cl.
  *G06T 7/60* (2017.01)
  *G06T 7/55* (2017.01)
  *B62D 15/02* (2006.01)
  *B62D 13/06* (2006.01)
  *G06T 13/80* (2011.01)
  *G08G 1/16* (2006.01)

(52) U.S. Cl.
  CPC ............ B62D 15/0275 (2013.01); G06T 7/55 (2017.01); G06T 7/60 (2013.01); H04N 5/232 (2013.01); *B60R 2300/30* (2013.01); *B60R 2300/607* (2013.01); *G06T 13/80* (2013.01); *G06T 2207/10028* (2013.01); *G06T 2207/30241* (2013.01); *G06T 2207/30252* (2013.01); *G08G 1/167* (2013.01)

(58) Field of Classification Search
  CPC .................................. B62D 15/0295; B62D 13/06; B62D 15/0275; B62D 15/029; B60Y 2400/92; B60R 2300/8086; B60R 11/04; B60R 1/00; B60R 2300/30; B60R 2300/607; G06T 7/60; G06T 7/55; G06T 2207/10028; G06T 2207/30252; G06T 2207/30241; G06T 13/80; G08G 1/167

See application file for complete search history.

Receiving, At A Processing Hardware, First Sensor System Data From A Sensor System In Communication With The Processing Hardware, The First Sensor System Data Associated With A First Trailer Position With Respect To The Tow Vehicle    602

↓

Determining, At The Processing Hardware, A Trailer Width Based On The First Sensor System Data    604

↓

Receiving, At The Processing Hardware, Second Sensor System Data From The Sensor System, The Second Sensor System Data Associated With A Second Trailer Position With Respect To The Tow Vehicle    606

↓

Determining, At The Processing Hardware, A Trailer Length Based On The Second Sensor Data    608

↓

Determining, At The Processing Hardware, A Separation Distance Between The Trailer And The Tow Vehicle Based On The First Sensor System Data And /or The Second Sensor System Data    610

↓

Retrieving From Hardware Memory In Communication With The Processing Hardware, A Vehicle Length And A Vehicle Width    612

↓

Generating, At The Processing Hardware, An Overhead Image Including A Vehicle Representation And A Trailer Representation Based On The Trailer Width, The Trailer Length, The Separation Distance, The Vehicle Length, And The Vehicle Width    614

↓

Transmitting, From The Processing Hardware To A Display In Communication With The Processing Hardware, Instructions To Display The Overhead Image    616

```
┌─────────────────────────────────────────────────────┐
│ Receiving, At A Processing Hardware, A First Image  │
│ From A Camera Positioned On A Rear Side Of The Tow  │
│ Vehicle For Capturing A Rear Environment Of The Tow │
│ Vehicle, The First Image Including A Front          │
│ End Of The Trailer                              702 │
└─────────────────────────────────────────────────────┘
                          ↓
┌─────────────────────────────────────────────────────┐
│ Determining, At The Processing Hardware, A Trailer  │
│ Width Based On The First Image                      │
│                                                 704 │
└─────────────────────────────────────────────────────┘
                          ↓
┌─────────────────────────────────────────────────────┐
│ Receiving, At The Processing Hardware, A Second     │
│ Image From The Camera, The Second Image Including   │
│ A Side Of The Trailer And The Front End             │
│                                                 706 │
└─────────────────────────────────────────────────────┘
                          ↓
┌─────────────────────────────────────────────────────┐
│ Determining, At The Processing Hardware, A Trailer  │
│ Length Based On The Second Image                    │
│                                                 708 │
└─────────────────────────────────────────────────────┘
                          ↓
┌─────────────────────────────────────────────────────┐
│ Receiving, At The Processing Hardware, Sensor Data  │
│ From One Or More Sensors Positioned On The Rear     │
│ Side Of The Tow Vehicle                             │
│                                                 710 │
└─────────────────────────────────────────────────────┘
                          ↓
┌─────────────────────────────────────────────────────┐
│ Determining, At The Processing Hardware, A          │
│ Separation Distance Between The Trailer And The Tow │
│ Vehicle Based On The Sensor Data                    │
│                                                 712 │
└─────────────────────────────────────────────────────┘
                          ↓
┌─────────────────────────────────────────────────────┐
│ Retrieving From Hardware Memory In Communication    │
│ With The Processing Hardware, A Vehicle Length And  │
│ A Vehicle Width                                 714 │
└─────────────────────────────────────────────────────┘
                          ↓
┌─────────────────────────────────────────────────────┐
│ Generating, At The Processing Hardware, An Overhead │
│ Image Including A Vehicle Representation And A      │
│ Trailer Representation Based On The Trailer Width,  │
│ The Trailer Length, The Separation Distance, The    │
│ Vehicle Length, And The Vehicle Width           716 │
└─────────────────────────────────────────────────────┘
                          ↓
┌─────────────────────────────────────────────────────┐
│ Transmitting, From The Processing Hardware To A     │
│ Display In Communication With The Processing        │
│ Hardware, Instructions To Display The Overhead      │
│ Image                                           718 │
└─────────────────────────────────────────────────────┘
```

FIG. 7

INFERRED BIRD'S EYE VIEW FOR TRAILER REVERSE ASSIST

TECHNICAL FIELD

The disclosure relates to a method for generating an inferred bird's-eye view associated with a tow vehicle attached to a trailer for trailer reverse assist.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some example, the trailer is electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

Many vehicles are now provided with rear-facing cameras. Such cameras provide the driver with a view of what is behind the vehicle. When a vehicle is towing a trailer, however, a rear-facing camera's "view" is essentially obstructed. When a trailer is attached to a tow vehicle, knowing how the trailer will move in response to a steering wheel rotation when the vehicle and trailer are backed (moved in a reverse or backward direction) into a space can be problematic. A method and apparatus for providing a "bird's-eye" view of the trailer and its tow vehicle, which would show how the trailer will move in response to wheel movement without having to move the vehicles, would be an improvement over the prior art.

SUMMARY

One aspect of the disclosure provides a method of generating an overhead view of a tow vehicle and a trailer attached to the tow vehicle. The method includes receiving, at a processing hardware, a first image from a camera positioned on a rear end of the tow vehicle for capturing a rear environment of the tow vehicle. The first image includes a front end of the trailer. The method also includes determining, at the processing hardware, a trailer width based on the first image. The method includes receiving, at the processing hardware, a second image from the camera. The second image includes a side of the trailer and the front end. The method also includes determining, at the processing hardware, a trailer length based on the second image. The method includes receiving, at the processing hardware, sensor data from one or more sensors positioned on the rear end of the tow vehicle. The method includes determining, at the processing hardware, a separation distance between the trailer and the tow vehicle based on the sensor data. In addition, the method includes retrieving from hardware memory in communication with the processing hardware, a vehicle length and a vehicle width. The method also includes generating, at the processing hardware, an overhead image including a vehicle representation and a trailer representation based on the trailer width, the trailer length, the separation distance, the vehicle length, and the vehicle width. The method includes transmitting, from the processing hardware to a display in communication with the processing hardware, instructions to display the overhead image.

Implementations of this aspect of the disclosure may include one or more of the following optional features. In some implementations, the vehicle representation and the trailer representation are proportional to the tow vehicle and the trailer respectively.

In some implementations, the method further includes receiving, at the processing hardware, a steering wheel angle from a steering wheel angle input device in communication with the processing hardware. The method includes adjusting, at the processing hardware, the overhead image based on the steering wheel angle.

In some example, the method includes receiving, at the processing hardware, a steering wheel angle from a steering wheel angle input device in communication with the processing hardware. The method includes determining, at the processing hardware, a position of the trailer representation based the steering wheel angle. The method also includes generating, at the processing hardware, an updated overhead image including the vehicle representation, the trailer representation, and a projected trailer representation, the projected trailer representation indicative of the position of the trailer at the steering wheel angle.

In some implementations, the camera captures the first image when the tow vehicle and the trailer are at a first position and the second image when the tow vehicle and the trailer are at a second position. In some examples, determining the separation distance includes calculating an elapsed time for a sensor signal to travel from the one or more sensors and back to the one or more sensors.

The method may further include receiving, at the processing hardware, vehicle sensor data from one or more vehicle in communication with the processing hardware by way of a network. The method also includes generating, at the processing hardware, the overhead image based on the trailer width, the trailer length, the separation distance, the vehicle length, the vehicle width, and the vehicle sensor data. The network may be configured to provide vehicle-to-vehicle communication between the processing hardware and other vehicles.

Another aspect of the disclosure provides a system for generating an overhead view of a tow vehicle and a trailer attached to the tow vehicle. The system includes a driver display, processing hardware in communication with the driver display, and hardware memory in communication with the processing hardware. The hardware memory stores instructions that when executed cause the processing hardware to execute a method. The method includes receiving a first image from a camera positioned on a rear end of the tow vehicle for capturing a rear environment of the tow vehicle. The first image includes a front end of the trailer. The method includes determining a trailer width based on the first image. The method includes receiving a second image from the camera, where the second image includes a side of the trailer and the front end. The method also includes determining a trailer length based on the second image. The method also includes receiving sensor data from one or more sensors positioned on the rear end of the tow vehicle. The method also includes determining a separation distance between the trailer and the tow vehicle based on the sensor data. The method also includes retrieving from the hardware memory, a vehicle length and a vehicle width. The method also includes generating an overhead image including a vehicle representation and a trailer representation based on the trailer width, the trailer length, the separation distance, the vehicle length, and the vehicle width. The method also includes transmitting to the driver display, instructions to display the overhead image.

Implementations of this aspect of the disclosure may include one or more of the following optional features. In some implementations, the vehicle representation and the trailer representation are proportional to the tow vehicle and the trailer respectively. The method may further include receiving a steering wheel angle from a steering wheel angle input device in communication with the processing hardware. The method may include adjusting the overhead image based on the steering wheel angle. The method further includes receiving a steering wheel angle from a steering wheel angle input device in communication with the processing hardware. The method includes determining a position of the trailer representation based the steering wheel angle. The method also includes generating an updated overhead image including the vehicle representation, the trailer representation, and a projected trailer representation, the projected trailer representation indicative of the position of the trailer at the steering wheel angle. In some examples, the camera captures the first image when the tow vehicle and the trailer are at a first position and the second image when the tow vehicle and the trailer are at a second position. Determining the separation distance may include calculating an elapsed time for a sensor signal to travel from the one or more sensors and back to the one or more sensors. The method may further include receiving vehicle sensor data from one or more vehicle in communication with the processing hardware by way of a network. The method may also include generating the overhead image based on the trailer width, the trailer length, the separation distance, the vehicle length, the vehicle width, and the vehicle sensor data. The network may be configured to provide vehicle-to-vehicle communication between the processing hardware and other vehicles.

Yet another aspect of the disclosure provides a method of simulating an overhead view of a tow vehicle and trailer. The tow vehicle having a centerline, a front end, rear end with a camera, a length, width and wheel base. The trailer including: a hitch, a front end behind the hitch, a rear end behind the front end, a length between the hitch and rear end, a width, at least two wheels on an axle and a wheel base substantially equal to a distance between the axle and the hitch. The method includes capturing an image of the front end of the trailer from the camera attached to the rear end of the tow vehicle and providing the captured image to a processor. The processor executing program instructions stored in a non-transitory memory device which when executed which cause the processor to: determine the width of the trailer; determine a distance between the tow vehicle and the trailer; determine an angle between the centerline and the axle; generate an animation of a top view of the trailer attached to the rear end of the tow vehicle; and display the generated animation on a display device coupled to the processor, the generated animation representing a path that the tow vehicle and trailer will follow when the tow vehicle is moved rearwardly.

Implementations of this aspect of the disclosure may include one or more of the following optional features. In some implementations, the processor alters the generated animation responsive to receipt of a variable steering angle signal from a control device in the tow vehicle. The altered generated animation represents different paths that the trailer will follow when the tow vehicle is moved rearwardly. Determining a distance between the tow vehicle and the trailer includes determining the distance using an ultrasonic signal.

In some examples, the trailer has first and second parallel sides, which are sized, shaped and arranged to be substantially perpendicular to the axle. Determining an angle between angle between the vehicle centerline and the axle includes: determining a first distance between first side and the vehicle rear end using a first ultrasonic signal; determining a second distance between the second side and the vehicle rear end using a second ultrasonic signal; and calculating said angle between the vehicle center line and the trailer axle using a difference between the first and second distances.

Another aspect of the disclosure provides an apparatus for simulating an overhead view of a tow vehicle and trailer. The tow vehicle has a centerline, a front end, rear end with a camera (or other sensor like radar), a length, width and wheel base. The trailer includes: a hitch, a front end behind the hitch, a rear end behind the front end, a length between the hitch and rear end, a width, at least two wheels on an axle and a wheel base substantially equal to the distance between the axle and the hitch. The apparatus includes: a camera, configured to capture an image of the front end of the trailer; a display device; a processor coupled to the camera and the display device; a non-transitory memory device coupled to the processor and storing program instructions. When the instructions are executed the processor is configured to: determine the width of the trailer using the captured image; determine a distance between the tow vehicle and the trailer from the captured image; determine an angle between the centerline and the trailer axle from the captured image; generate an animation of a top view of the trailer attached to the rear end of the tow vehicle; and display the generated animation on a display device coupled to the processor. The generated animation representing a path that the tow vehicle and trailer will follow when the tow vehicle is moved rearwardly.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that is capable of generating a bird's eye-view image of the tow vehicle and the trailer to be displayed on a display. The generated image includes a vehicle representation and a trailer representation of the vehicle and trailer respectively that are proportional to the dimensions of the vehicle and the trailer. Moreover, the generated image may provide the driver with a better view of the position of the trailer with respect to the vehicle when the vehicle is making a turn.

Referring to FIGS. 1-4, a tow vehicle 10 is attached to a trailer 80 at a trailer hitch 27. The tow vehicle 10 includes a front end 12, a rear end 14, a passenger or right side 16, and a driver or left side 18. In some implementations, the vehicle 10 includes a sensor system 19 that includes sensors 20, 22 to provide sensor system data 29 that may be used to determine one or more measurements. The sensor system 19 may include one or more sensors 20, 22 and/or one or more cameras 26. The sensor 20, 22 provides sensor data 23 while the camera provides images 25. The sensor system data 29 may include sensor data 23 and/or images 25. The one or more sensors 20, 22 may include, but are not limited to, ultrasonic range finder, radar, sonar, LIDAR (Light Detection and Ranging, which can entail optical remote sensing that measures properties of scattered light to find range and/or other information of a distant target), LADAR (Laser Detection and Ranging), etc. As shown, a first sensor 20 and a second sensor 22 are attached at the rear end 14 of the tow vehicle 10 along both the left side 18 and the right side 16. However, the vehicle 10 may support only one sensor 20 positioned, for example, along the vehicle centerline 28. Additional sensors may also be possible.

Figure 1:
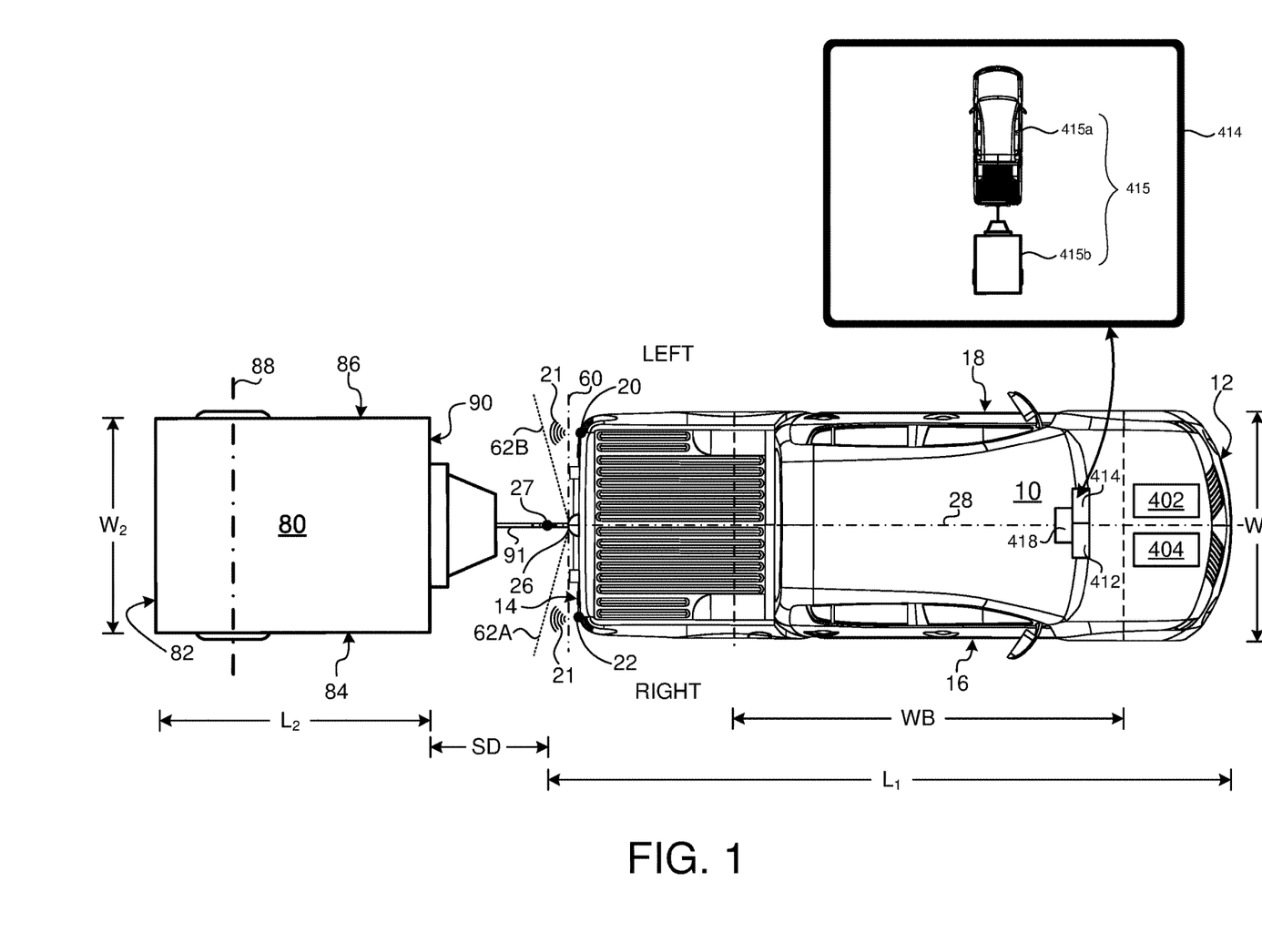
FIG. 1 is a plan view of a trailer attached to a tow vehicle.
Figure 2:
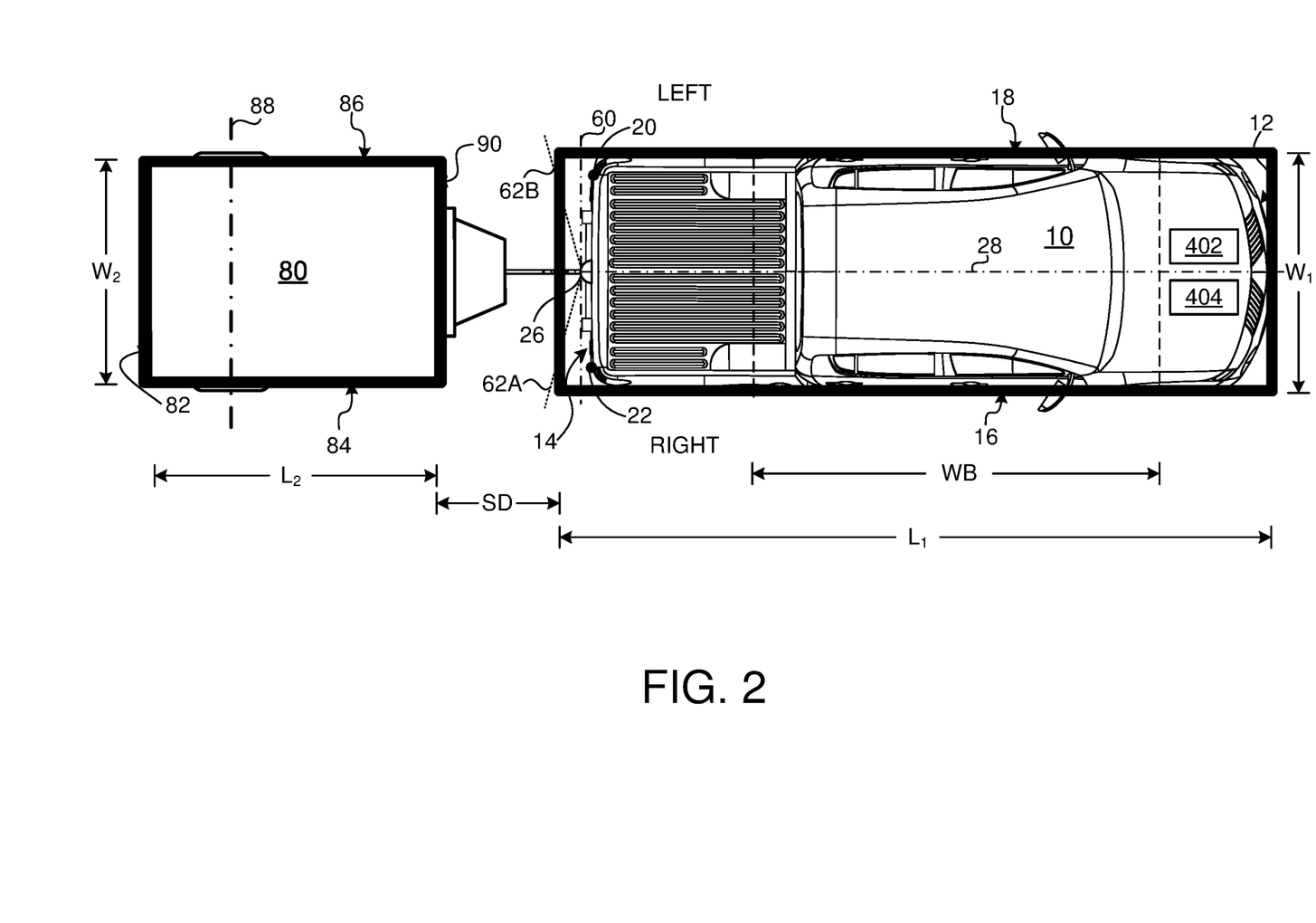
FIG. 2 is another plan view of the trailer attached to the tow vehicle but showing the outer dimensions of both the trailer and the tow vehicle.

In some implementations, a rear-facing camera 26 is attached above a trailer hitch 27 which is also attached to the rear end 14 of the tow vehicle 10. The rear facing camera 26 may be a monocular camera, binocular camera, or another type of sensing device capable of providing a view of the rear travelling path of the tow vehicle 10. The rear facing camera 26 captures images 25 of a rear environment of the vehicle 10. For example, when the trailer 80 is attached to the vehicle 10 at the trailer hitch 27, the images 25 captured by the camera 26 include a representation of the front end 90 of the trailer 80.

The tow vehicle 10 has a "centerline," which is an imaginary line 28 running through the length of the vehicle, substantially equidistant from the right side 16 and left side 18. In some examples, the trailer hitch 27 is located on the centerline 28. Therefore, the trailer 80 is attached to the tow vehicle 10 at the tow vehicle centerline 28.

In FIG. 1, a reference line identified by reference numeral 60 is "normal" or imaginary line that is substantially perpendicular to the centerline 28 and substantially coplanar with the rear end 14 of the tow vehicle 10. Reference lines 62A and 62B identify the field of vision of the camera 26. When the vehicle 10 and the trailer 80 are aligned, i.e., the vehicle 10 and the trailer 80 are substantially aligned along the centerline 28, a trailer angle $\alpha$ between the vehicle 10 and the trailer 80 is equal to zero. However, when the trailer 80 and the vehicle 10 are not aligned, then the trailer angle $\alpha$ is greater or less than zero, depending on the position of the trailer 80 with respect to the vehicle 10.

Figure 4:
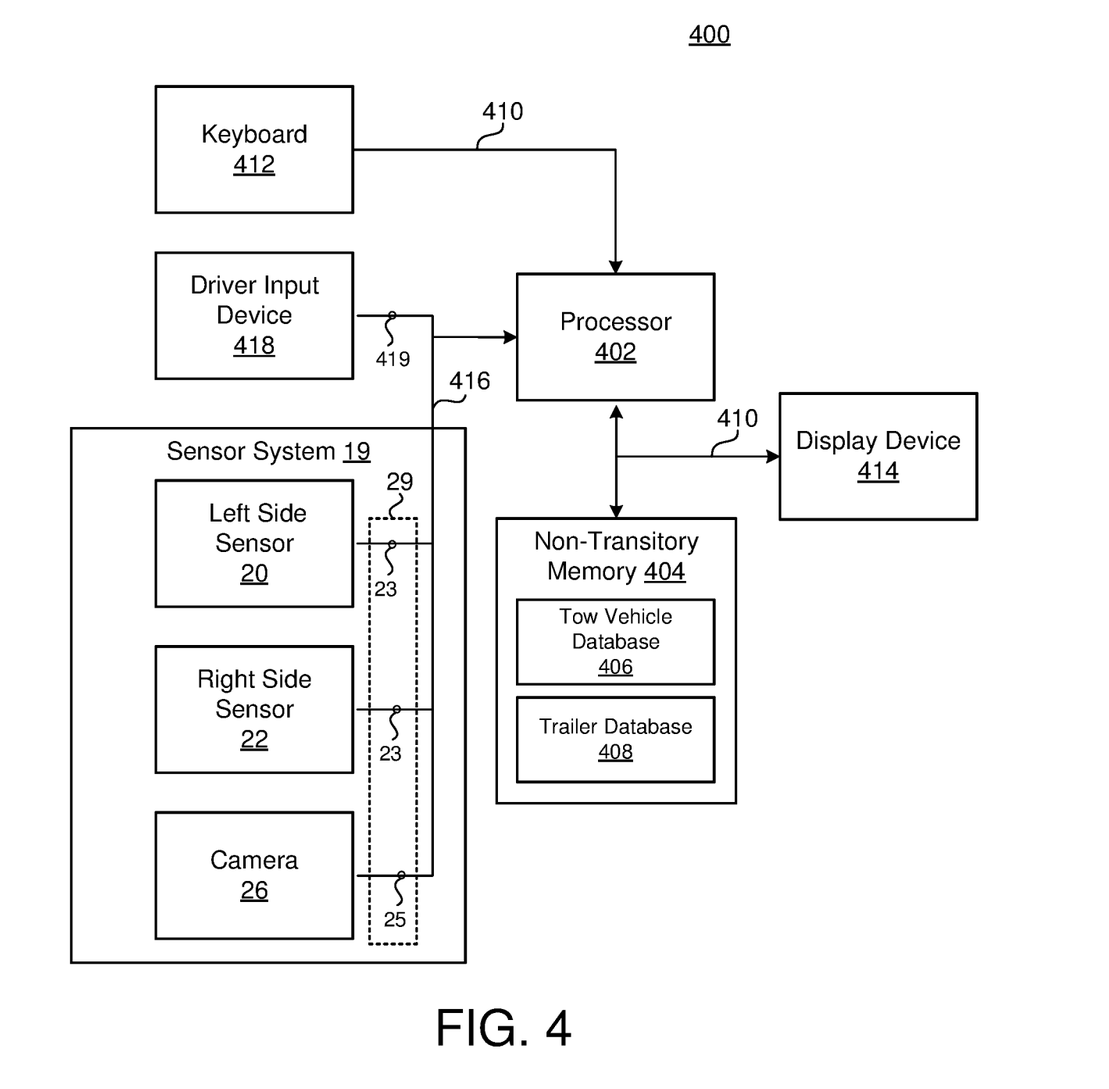
FIG. 4 is a block diagram of an exemplary system for providing a bird's-eye view of a tow vehicle and an attached trailer.

The vehicle 10 includes a vehicle processor 402, e.g., computing device or data processing hardware, such as, but not limited to, central processing unit having one or more computing processors, in communication with non-transitory memory or hardware memory 404, e.g., a hard disk, flash memory, random-access memory, capable of storing instruction executable on the computing processors(s) 402. In some examples, the non-transitory memory 404 stores instructions that when executed, causes the processor 402 to determine the dimensions of the trailer 80 based on received sensor system data 29 and generate an animation of the top view of the trailer 80 attached to the rear end 14 of the tow vehicle 10 based on the determined dimensions.

Referring now to the trailer 80, it too has a rear end 82, a right side 84, left side 86, an axle 88 and front end 90. A bar 91 extending from the front end 90 attaches to the tow vehicle 10 at the trailer hitch 27.

In some implementations, signals 21 (e.g., acoustic signals or waves) from the sensors 20 and 22 strike the front end 90 of the left side 86 and right side 84 of the trailer 80 and are reflected. The elapsed time for the signals 21 to leave a sensor 20, 22, strike the trailer sides 86, 86 and return to the sensor 20, 22 provides a "round trip" time by which the processor 402 may calculate the separation distance between the sensors 20, 22 and the sides 84, 86 of the trailer 80 using the known speed of sound. In some examples, for each sensor 20, 22, the elapsed time for the signals 21 may be different, which indicates that the trailer 80 and the vehicle 10 are not aligned and the trailer angle $\alpha$ is greater or less than zero, depending on the position of the trailer 80 with respect to the vehicle 10. However, if the elapsed time for the signals 21 is equal, then the processor 402 determines that the trailer 80 and the vehicle 10 are aligned, and the trailer angle $\alpha$ is equal to zero. Moreover, the processor 402 may determine the trailer angle $\alpha$ based on the elapsed time of each signal 21. An angle of the axle 88 relative to the reference line 60 as well as the centerline 28 or the trailer angle $\alpha$ may thus be determined from distance or spacing measurements made by the sensors 20, 22. In other implementations, the processor 402 may analyze the images 25 and determine the separation distance SD and/or the trailer angle $\alpha$.

With continued reference to FIGS. 1 and 2, the tow vehicle 10 has an overall length $L_1$, an overall width $W_1$ and a wheel base, which is the distance between the centerline 28 of the vehicle's axles, WB. The trailer 80 has an overall length $L_2$, and an overall width $W_2$. The trailer 80 is separated from the tow vehicle 10 by a separation distance, SD, defined as the distance between the front end 90 of the trailer 80 and the trailer hitch 27 or the rear end 14 of the tow vehicle 10.

In some implementations, the processor 402 determines the width, $W_2$ of the trailer 80 by analyzing sensor system data 29 (e.g., sensor data 23 and/or images 25) received from the sensor system 19. In some examples, the processor 402 determines the width, $W_2$ of the trailer 80 by analyzing images 25 received from the camera 26 attached to the rear end 14 of the tow vehicle 10. The camera 26 captures a single frame of video of the trailer front end 90 and the processor 402 compares that captured image to one or more template images of known trailer widths. By way of example, as the distance SD between the trailer 80 and the tow vehicle 10 increases, the apparent size of the trailer 80 as represented by its captured image 25 will decrease. As the same trailer 80 moves closer to the camera 26, its apparent size as captured by the image 25 will increase. If an image 25 of a trailer with a known width is compared to a captured image of a trailer behind the tow vehicle 10, the trailer's width can at least be estimated by a comparison of those two images.

In some implementations, a driver may manually enter the trailer's width $W_2$ into a terminal, e.g., user driver input 412, located in the passenger compartment or a specification or identification of the trailer by its manufacturer's model number may be entered as well.

Yet in another example, the processor 402 may determine the width $W_2$ of the trailer 80 by analyzing the received images 25. For example, by analyzing the pixels within the image 25. Regardless of how the processor 402 determines the width $W_2$, determining the width $W_2$ and length $L_2$ of the trailer 80 is important to be able to generate a simulated overhead view of the tow vehicle 10 and trailer 80.

The length $L_2$ of the trailer 80 may be measured and manually input via the user driver input 412. The length $L_2$ of the trailer 80 may also be "looked up" in a tow vehicle database 406 resident in the non-transitory memory 404. In some examples, the processor 402 estimates the length $L_2$ of the trailer 80 by analyzing sensor system data 29 (e.g., sensor data 23 and/or images 25). For example, when the trailer 80 is positioned at an angle $\alpha$ relative to the tow vehicle 10 at which the front end 90 and rear end 82 of the trailer can both be "seen" by sensor system 19, then the processor 402 can estimate the length $L_2$ of the trailer 80. In some examples, the processor 402 estimates the length $L_2$ of the trailer 80 by analyzing one or more images 25 captured when the trailer 80 is at an angle $\alpha$ relative to the tow vehicle 10.

Once the processor 402 determines the dimensions of the trailer 80, i.e., the length $L_2$ and the width $W_2$, the distance SD from the rear end 14 of the tow vehicle 10 and the angle $\alpha$ between the vehicle centerline 28 and a trailer centerline 89, then the processor 402 generates an animation of the top view of the trailer 80 attached to the rear end 14 of the tow vehicle 10 by calculating the position of the trailer 80 relative to the tow vehicle's centerline 28 and generating an image of the trailer's profile or footprint.

Figure 3A:
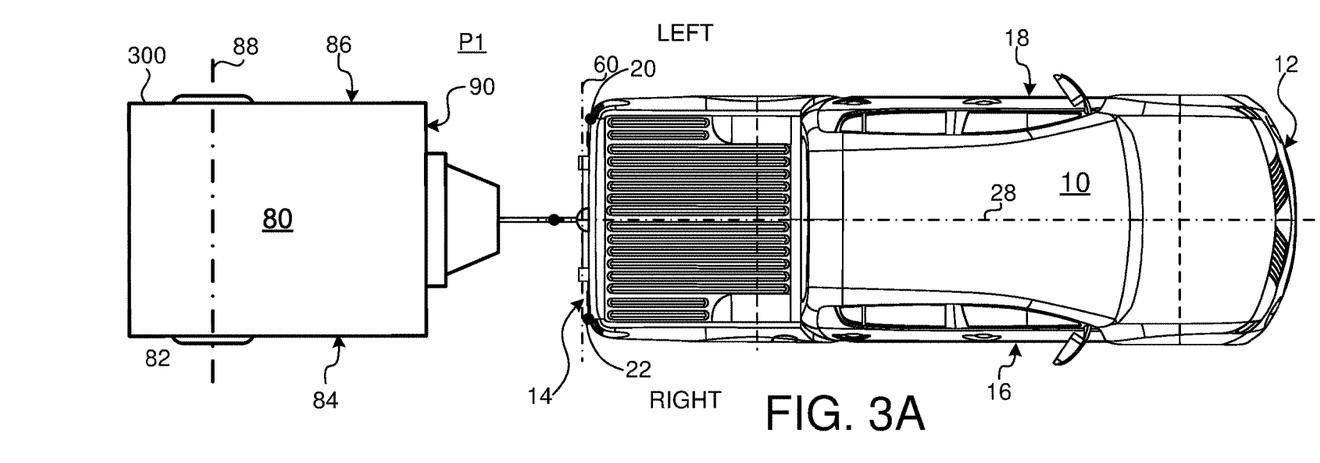
FIGS. 3A and 3B depict first and second position of the trailer attached to the tow vehicle.

FIG. 3A depicts the tow vehicle 10 and the trailer 80 in a first position P1 where the vehicle 10 is substantially aligned with the trailer 80. In other words, the trailer angle is zero. Referring to FIG. 4A, once the processor determines the measurements of the vehicle 10 and the trailer 80, then the processor 402 generates a vehicle-trailer representation 415 that includes a vehicle representation 415a and a trailer representation 415b. The vehicle-trailer representation 415 is proportional to the vehicle 10 and the trailer 80. For example, if the trailer has a length $L_2$ that is greater than a vehicle length $L_1$, then the vehicle-trailer representation 415 shows a trailer representation having a greater length than the vehicle representation as shown on the display. Conversely, if the trailer has a length $L_2$ that is shorter than a vehicle length $L_1$, then the vehicle-trailer representation 415 shows a trailer representation having a shorter length than the vehicle representation as shown on the display.

Figure 3B:
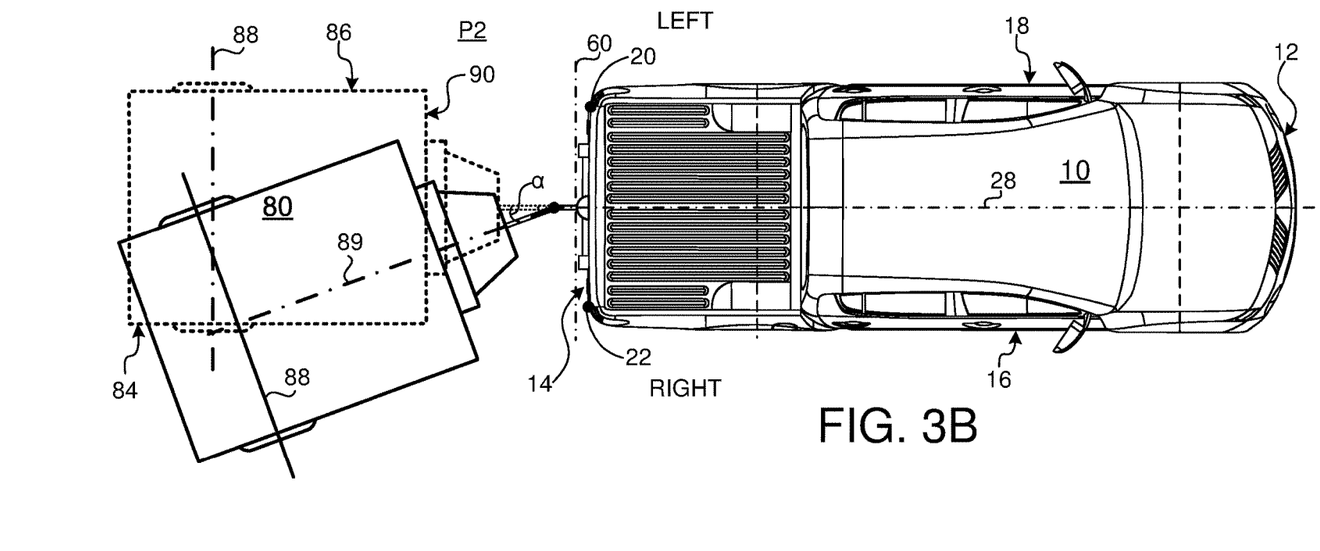
Figure 3C:
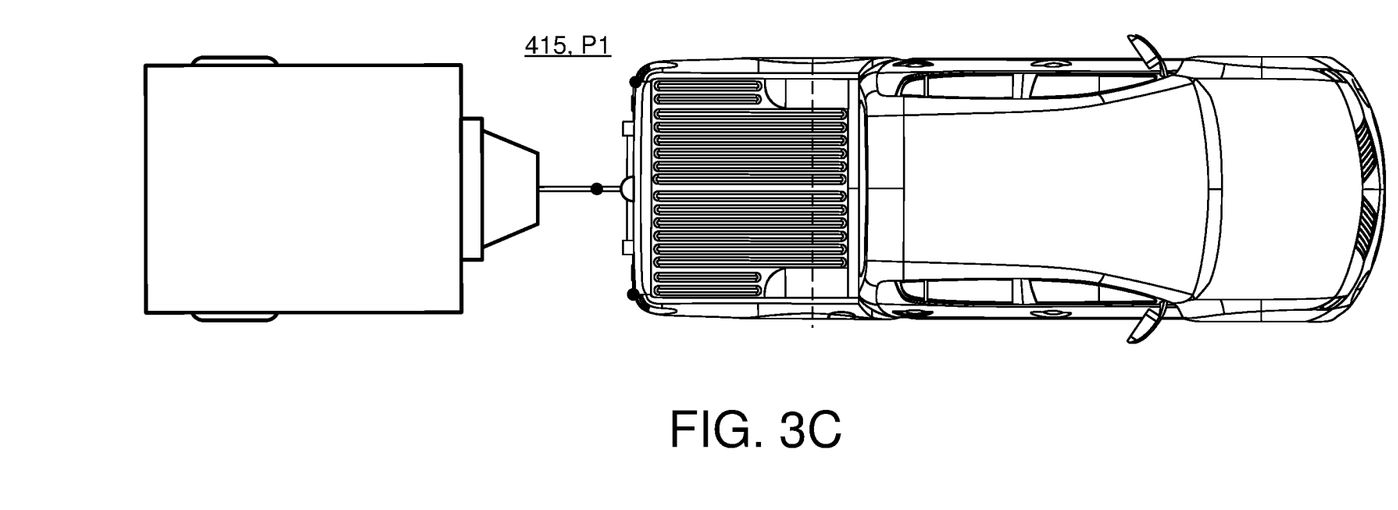
FIGS. 3C and 3D depict an exemplary rendering or display of a bird's-eye view of a trailer attached to a tow vehicle according to FIGS. 3A and 3B respectively.
Figure 3D:
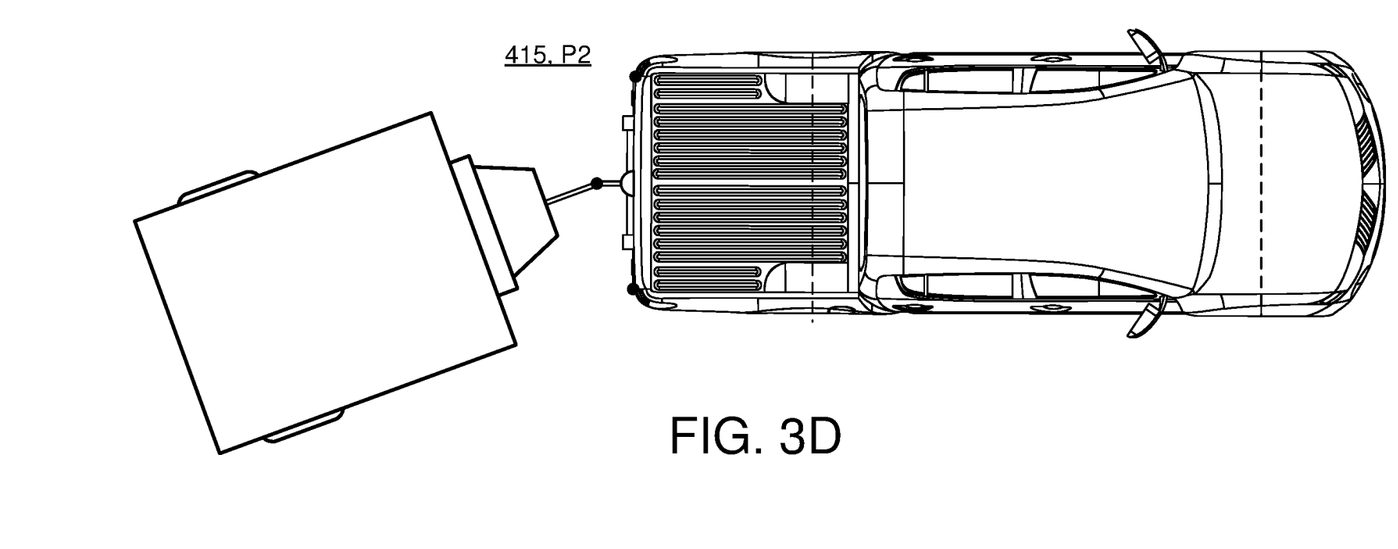

FIG. 3B depicts the tow vehicle 10 and the trailer 80 in a second position P2 where the trailer 80 is positioned at a trailer angle $\alpha$ with respect to the vehicle 10. FIG. 4B depicts the vehicle-trailer representation 415 associated with FIG. 3B. As shown, the processor 402 updates the display 414 when the position of the trailer 80 changes with respect to the vehicle 10, or when the trailer angle $\alpha$ changes from a first position P1 to a second position P2. The processor 402 may determine the trailer angle $\alpha$ by determining a first distance between the first side front end 84, 90 of the trailer 80 and the vehicle rear end 14, i.e., the second sensor 22, using a first signal 21. The processor 402 may determine a second distance between the second side front end 86, 90 and the vehicle rear end 14, i.e., the first sensor 20, using a second ultrasonic signal 21. The processor 402 can then calculate the trailer angle $\alpha$ based on the difference between the first and second distances.

FIG. 4 is a block diagram of an apparatus 400 for simulating the overhead view 415 of the tow vehicle 10 and the trailer 80, as described in FIGS. 1-3C. As set forth below, various components are necessarily located at the rear end of the vehicle while others are located inside the passenger compartment. A processor and an associated memory device can be located virtually anywhere.

The apparatus 400 includes the vehicle processor 402 and non-transitory memory 404 which stores program instructions for the processor 402. As previously described, when the processor 402 executes the stored instruction, the instructions cause the processor 402 to perform, among other things, the calculations and generation of the overhead view 415 as described above.

In addition to storing program instructions, the non-transitory memory 404 may include a tow vehicle database 406, the contents of which include physical characteristics of motor vehicles capable of pulling a trailer. Such characteristics would include, but not be limited to, the vehicle's overall length $L_1$, its overall width $W_1$ and its wheel base WB. The processor 402 uses these characteristics to generate the overhead image 415.

The non-transitory memory 404 may also store a trailer database 408 which like the tow vehicle database 406 is a list or table of trailers by manufacturer and which includes trailers' lengths, widths, number of axles and the length of the tow bar extending from the front end of the trailer and its hitch. The database may be reduced to contain only previously used trailers for easy access, with values either entered in by the driver or determined by the system without user input.

In some implementations, the display device 414 is in communication with the processor 402. The display device 414 may be located in the dashboard of the tow vehicle 10. The display device 414 may be a touch screen display.

The processor 402, non-transitory memory 404 and the display device 414 may be in communication with each other over a conventional address/data/control bus 410. In some examples, the bus 410 couples the processor 402 to a user input device, such as a keyboard, 412 also located in the passenger compartment, for example, in the dashboard. The user input device 412 allows a driver or other occupant of the vehicle 10 to manually enter physical characteristics of the tow vehicle 10, the trailer 80, and spacing SD between the tow vehicle 10 and trailer 80.

In some examples, the left side sensor 20 and the right side sensor 22 as well as the camera 26 are also in communication with the processor 402 through the same control bus 416. As described above, the sensors 20 and 22 enable distances between the rear end 14 of the tow vehicle 10 and the front end 90 of the trailer 80 along the sides 16, 18, 84, 86 of both vehicles 10, 80 to be accurately determined. The processor 402 receives images from the camera 26, and based on the received images, the processor 402 determines the trailer's width $W_2$, the separation distance SD between the tow vehicle 10 and the trailer 80. In addition, the processor 402 may determine the angle between the centerline 28 of the tow vehicle 10 and the trailer 80 based on the images captured by the camera 26.

In some examples, the vehicle 10 includes a driver steering wheel angle input device 418, such as, for example, a rotating knob on the vehicle dashboard or a position sensor coupled to the vehicle's steering wheel. The steering wheel angle input device 418 is in communication with the processor 402. In some examples, the steering wheel angle input device 418 is coupled to the processor by way of the control bus 410. The steering wheel angle input device 418 provides signals that represent changes in a steering angle of the tow vehicle 10.

Those of ordinary skill in the art know that when a tow vehicle is driven forward, rotating the steering wheel clockwise causes the vehicle to turn or "go" right. Conversely, rotating the steering wheel counter-clockwise causes the vehicle to turn or "go" left.

When the tow vehicle 10 having the attached trailer 80 is reversed, i.e., driven backward, rotating a steering wheel of the vehicle 10 clockwise or counterclockwise causes the attached trailer 80 to be directed in the opposite direction. In other words, rotating the steering wheel clockwise causes the tow vehicle 10 going backward to push the attached trailer 80 "left." Rotating the steering wheel counter-clockwise causes the tow vehicle 10 going backward to push the attached trailer 80 "right."

Figure 3E:
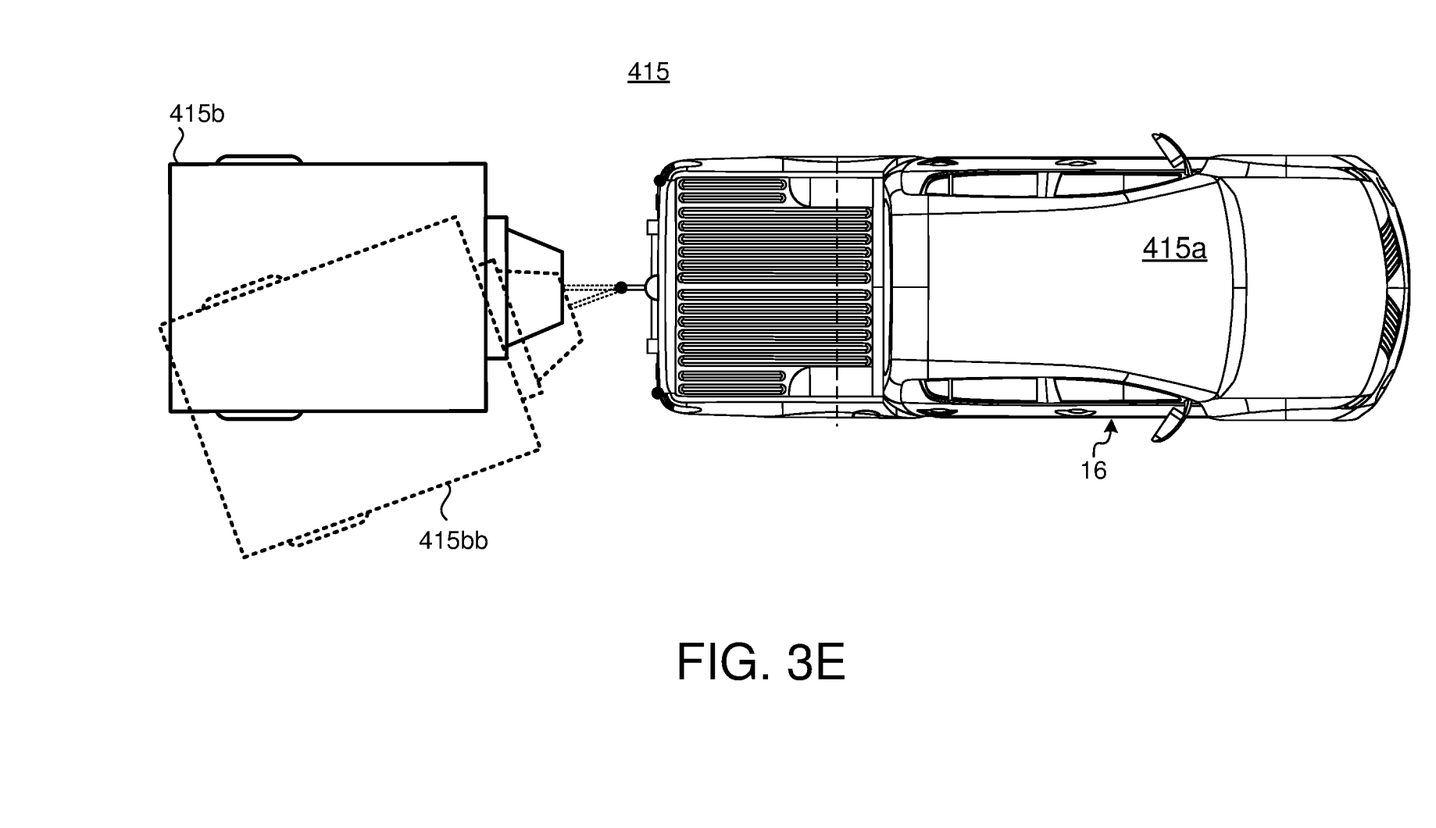
FIG. 3E depicts an exemplary rendering or display of a bird's-eye view of a trailer attached to a tow vehicle based on an input steering angle.

In some implementations, the steering wheel angle input device 418 transmits a steering wheel angle signal to the processor 402. The processor 402 calculates a change in the angle between the vehicle's centerline 28 and the trailer's axle 88. In addition, the processor 402 generates an animation of the top view of the trailer 80 and vehicle 10 based on the change in the trailer angle α. As such, the driver can view on the display 414 how the trailer 80 moves in response to the steering wheel angle. In some examples, as the driver is changing the steering wheel angle, the trailer angle α and the overhead 412 are updated in real time. However, in other examples as shown in FIG. 3E, as the driver is changing the steering wheel angle, only the overhead 415 updates and then after a driver input, the trailer angle α also changes while the tow vehicle 10 is moving rearward or forward. In this case, a ghost image 145bb (i.e., a second trailer representation) of the trailer 80 may be overlain on the position of the actual trailer representation 415b. As shown, the processor 402 may provide the driver with warnings regarding jack-knifing because the processor 402 considers the dimensions of the vehicle 10 and the trailer 80.

Figure 5:
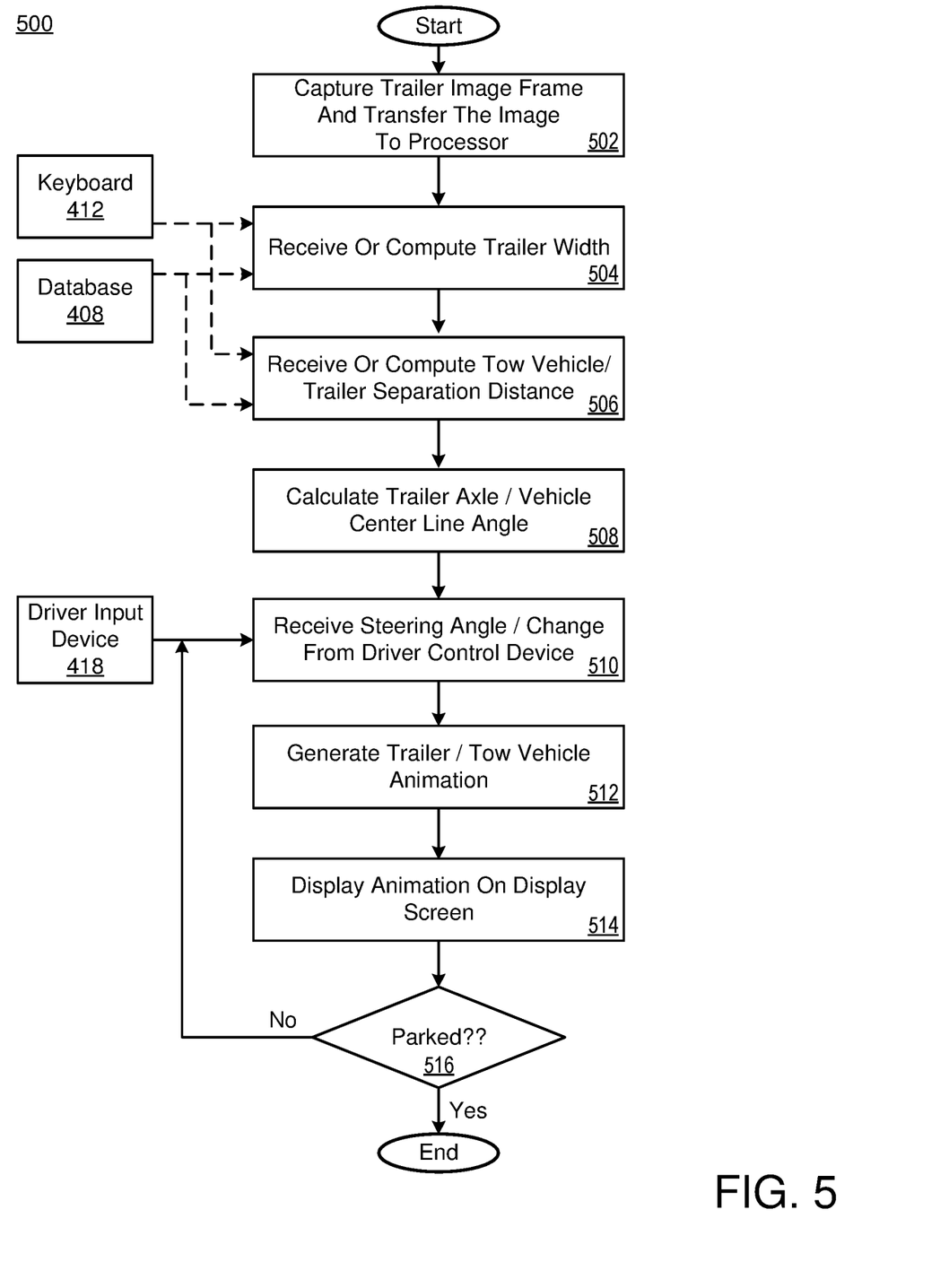
FIG. 5 depicts an exemplary method of simulating an overhead view of a tow vehicle and trailer and by which a bird's-eye view of the trailer attached to the vehicle are provided to a driver.

Referring now to FIG. 5, a method 500 of simulating an overhead view of the tow vehicle 10 and the trailer 80 as described in FIGS. 1-4. At block 502, the camera 24 positioned on the back end 14 of the vehicle 10 captures an image of the trailer 80 positioned behind the tow vehicle 10. The camera 24 sends at least one frame of that image that is captured to the processor 402.

At block 504 the width $W_2$ of the trailer 80 is determined. The width $W_2$ of the trailer 80 may be received through the input device 412 such as the keyboard, for example, inputted by a driver. In some examples, the width $W_2$ of the trailer 80 is determined by comparing the image of the trailer 80 with one or more pre-captured images that are stored in the database 408. The processor 402 compares the captured image with the pre-captured images that identify a trailer having an associated trailer length. In other examples, the processor 402 receives sensor data 23 from one or more sensors positioned on the rear end 14 of the vehicle 10. The processor 402 determines the width $W_2$ of the trailer 80 based on the received sensor data 23. At block 506, the processor 402 determines a distance SD between the tow vehicle 10 and the trailer 80. In some examples, the processor 402 receives the distance SD between the tow vehicle 10 and the trailer 80 from the keyboard 412 by way of a driver entry. In other examples, the processor 402 receives sensor data 23 from one or more sensors positioned on the rear end 14 of the vehicle 10, and based on the received sensor data 23, the processor 402 determines the distance SD between the tow vehicle 10 and the trailer 80.

At block 508, the processor 402 calculates a change in the angle between the vehicle's centerline 28 and the trailer axle 88 responsive to steering angle changes by the driver input device 418. At step 512, the processor 402 generates an animation or video image. That animation, whether it is a video or a single still image is displayed on a display panel in step 514, for example, on the dashboard of the passenger compartment. Finally, at step 516 the processor 402 determines whether the vehicle 10 is parked. As used herein, the word parked means moved to a final location where the vehicle will be kept. If the vehicle 10 is not parked, the method 500 returns to step 510 to receive a different steering angle input signal from either a dashboard mounted input device or the steering wheel itself.

In some implementations, the vehicle 10 is in communication with other vehicles or devices via a shared network (not shown). The shared network may include any type of network that allows sending and receiving communication signals, such as a wireless telecommunication network, a cellular telephone network, a time division multiple access (TDMA) network, a code division multiple access (CDMA) network, Global system for mobile communications (GSM), third generation (3G) network, fourth generation (4G) network, a satellite communications network, and other communication networks. The shared network may include one or more of a Wide Area Network (WAN), a Local Area Network (LAN), and a Personal Area Network (PAN). In some examples, the shared network includes a combination of data networks, telecommunication networks, and a combination of data and telecommunication networks. The shared network provides access to cloud computing resources, such as processing units and/or storage resources. The term 'cloud' services generally refers to a service performed not locally on the vehicle, but rather delivered from one or more remote devices accessible via one or more networks.

In some implementations, the network provides vehicle-to-vehicle (V2V) communication between the vehicle 10 and other vehicles. The vehicle 10, i.e., the processor 402 is configured to receive data from one or more vehicles via the network and analyze the received data. In some examples, the received data includes information associated with the current tow vehicle 10. In this case, the processor 402 generates the bird's-eye view using the received data, providing a more accurate rendering of the vehicle and trailer. In some examples, the processor 402 receives sensor data 23 from the sensors 20, 22 supported by the vehicle 10 and based on the received sensor data 23 and the data provided from other vehicles by way of V2V communication, the processor 402 provides a better rendering of the bird's-eye-view.

Figure 6:
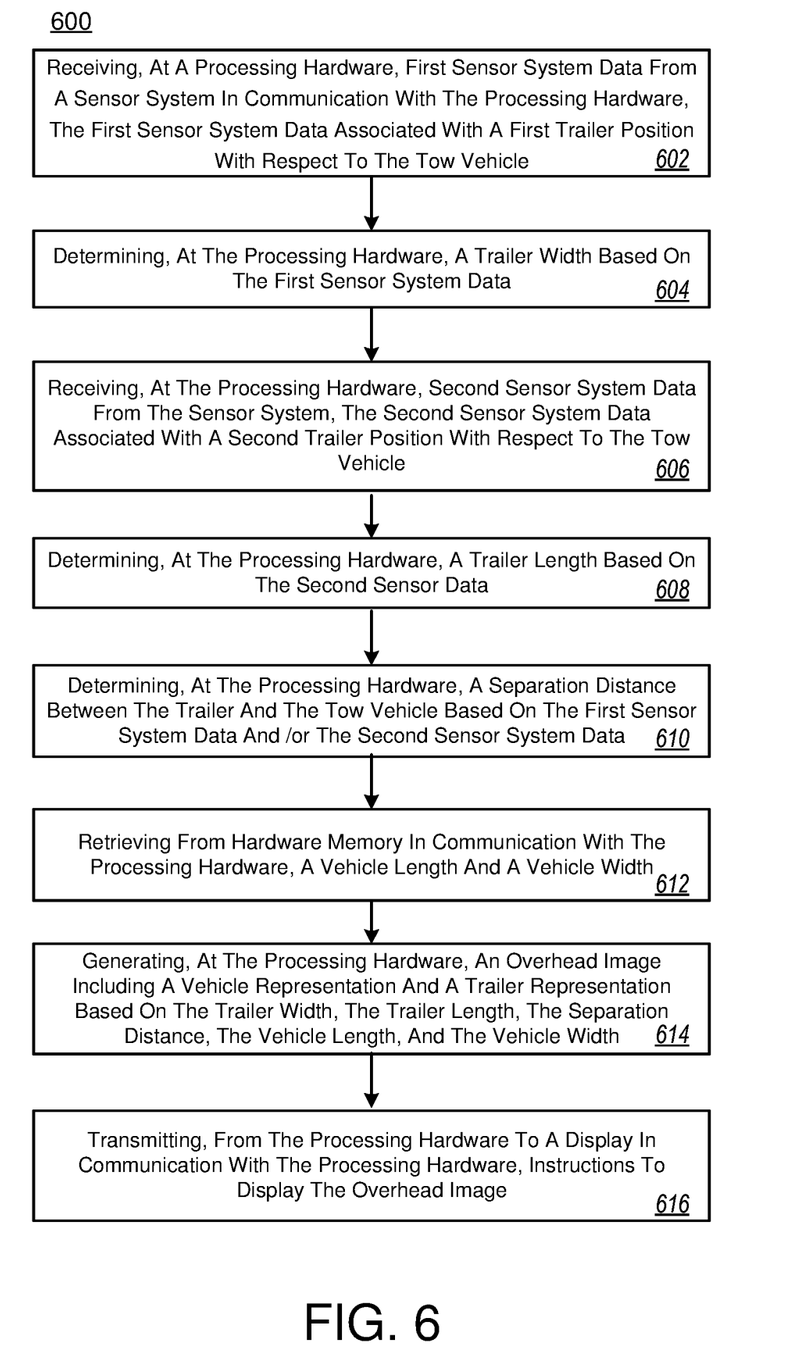
FIG. 6 is a schematic view of an exemplary arrangement of operation for generating and displaying an overhead view.

FIG. 6 provides an example arrangement of operations for a method 600 of generating an overhead view 415 of a tow vehicle 10 and a trailer 80 attached to the tow vehicle 10 using the system of FIGS. 1-5. At block 602, the method 600 receiving, at a processing hardware 402 402, first sensor system data 29 from a sensor system 19 in communication with the processing hardware 402. The sensor system 19 includes a sensor 20, 22 and/or a camera 26. The first sensor system data 29 is associated with a first trailer position P1, P2 with respect to the tow vehicle 10. At block 604, the method 600 includes determining, at the processing hardware 402, a trailer width $W_2$ based on the first sensor system data 29. At block 604, the method 600 includes receiving, at the processing hardware 402, second sensor system data 29 from the sensor system 19. The second sensor system data 29 is associated with a second trailer position P1, P2 with respect to the tow vehicle 10. At block 606, the method 600 includes determining, at the processing hardware 402, a trailer length $L_2$ based on the second sensor data. At block 608, the method 600 includes determining, at the processing hardware 402, a separation distance SD between the trailer 80 and the tow vehicle 80 based on the first sensor system data 29 and/or the second sensor system data 29. At block 612, the method 600 includes retrieving from hardware memory 404 in communication with the processing hardware 402, a vehicle length $L_1$ and a vehicle width $W_1$. At block 614, the method 600 includes generating, at the processing hardware 402, an overhead image 415 including a vehicle representation 415a and a trailer representation 415b based on the trailer width $W_2$, the trailer length $L_2$, the separation distance SD, the vehicle length $L_1$, and the vehicle width $W_1$. At block 616, the method 600 includes transmitting, from the processing hardware 402 to a display 414 in communication with the processing hardware 402, instructions to display the overhead image 415.

In some implementations, the method 600 further includes receiving, at the processing hardware 402, a steering wheel angle 419 from a steering wheel angle input device 418 (e.g., a rotating knob) in communication with the processing hardware 402. The method 700 includes adjusting, at the processing hardware 402, the overhead image 25 based on the steering wheel angle.

In some example, the method 600 includes receiving, at the processing hardware 402, a steering wheel angle 419 from a steering wheel angle input device 418 (e.g., a rotating knob) in communication with the processing hardware 402. The method 600 includes determining, at the processing hardware 402, a position of the trailer representation 415b based the steering wheel angle 419. The method 600 also includes generating, at the processing hardware 402, an updated overhead image 415 including the vehicle representation 415a, the trailer representation 415b, and a projected trailer representation 415bb, the projected trailer representation 415bb indicative of the position of the trailer after executing the steering wheel angle 419.

Figure 7:
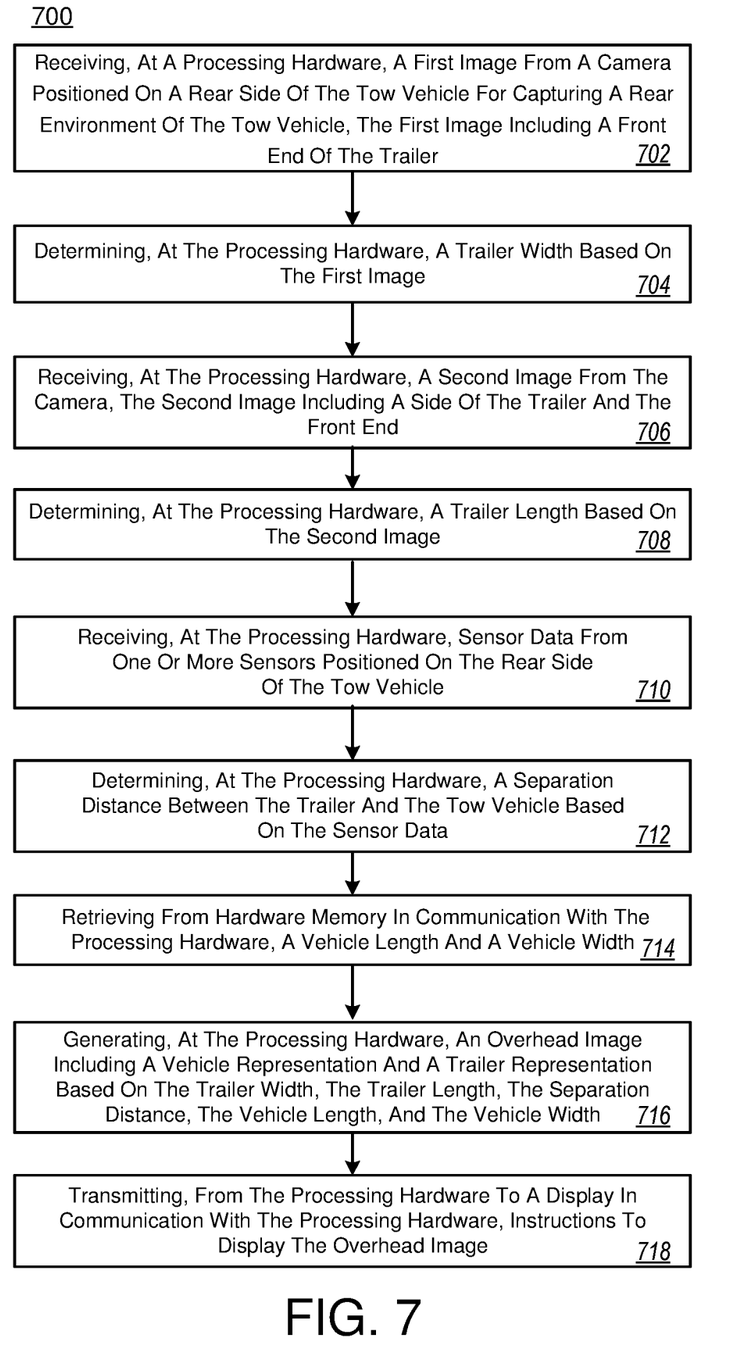
FIG. 7 is a schematic view of an exemplary arrangement of operation for generating and displaying an overhead view.

FIG. 7 provides an example arrangement of operations for a method 700 of generating an overhead view 415 of a tow vehicle 10 and a trailer 80 attached to the tow vehicle 10 using the system of FIGS. 1-5. At block 702, the method 700 includes receiving, at a processing hardware 402, a first image 25 from a camera 26 positioned on a rear end 14 of the tow vehicle 10 for capturing a rear environment of the tow vehicle 10. The first image 25 includes a front end 90 of the trailer 80. At block 704, the method 700 includes determining, at the processing hardware 402, a trailer width $W_2$ based on the first image 25. At block 706, the method 700 includes receiving, at the processing hardware 402, a second image 25 from the camera 26. The second image 25 includes a side 84, 86 of the trailer 80 and the front end 90. At block 708, the method 700 includes determining, at the processing hardware 402, a trailer length $L_2$ based on the second image 25. At block 710, the method 700 includes receiving, at the processing hardware 402, sensor data 23 from one or more sensors 20, 22 positioned on the rear end 14 of the tow vehicle 10. At block 712, the method 700 includes determining, at the processing hardware 402, a separation distance SD between the trailer 80 and the tow vehicle 10 based on the sensor data 23. In addition, at block 714, the method 700 includes retrieving from hardware memory 404 in communication with the processing hardware 402, a vehicle length $L_1$ and a vehicle width $W_1$. At block 716, the method 700 includes generating, at the processing hardware 402, an overhead image 415 including a vehicle representation 415a and a trailer representation 415b based on the trailer width $W_2$, the trailer length $L_2$, the separation distance SD, the vehicle length $L_1$, and the vehicle width $W_1$. At block 718, the method 700 includes transmitting, from the processing hardware 402 to a display 414 in communication with the processing hardware 402, instructions to display the overhead image 415.

In some implementations, the vehicle representation 415a and the trailer representation 415b are proportional to the tow vehicle 10 and the trailer 80 respectively.

In some implementations, the method 700 further includes receiving, at the processing hardware 402, a steering wheel angle 419 from a steering wheel angle input device 418 (e.g., a rotating knob) in communication with the processing hardware 402. The method 700 includes adjusting, at the processing hardware 402, the overhead image 25 based on the steering wheel angle.

In some example, the method 700 includes receiving, at the processing hardware 402, a steering wheel angle 419 from a steering wheel angle input device 418 (e.g., a rotating knob) in communication with the processing hardware 402. The method 700 includes determining, at the processing hardware 402, a position of the trailer representation 415b based the steering wheel angle 419. The method 700 also includes generating, at the processing hardware 402, an updated overhead image 415 including the vehicle representation 415a, the trailer representation 415b, and a projected trailer representation 415bb, the projected trailer representation 415bb indicative of the position of the trailer after executing the steering wheel angle 419.

In some implementations, the camera 26 captures the first image 25 when the tow vehicle 10 and the trailer 80 are at a first position and the second image 25 when the tow vehicle 10 and the trailer 80 are at a second position. In some examples, determining the separation distance SD includes calculating an elapsed time for a sensor signal 21 to travel from the one or more sensors 20, 22 and back to the one or more sensors 20, 22.

The method 700 may further include receiving, at the processing hardware 402, vehicle sensor data from one or more vehicles in communication with the processing hardware 402 by way of a network. The method 700 also includes generating, at the processing hardware 402, the overhead image 415 based on the trailer width $W_2$, the trailer length $L_2$, the separation distance SD, the vehicle length $L_1$, the vehicle width $W_1$, and the vehicle sensor data. The network may be configured to provide vehicle-to-vehicle communication between the processing hardware 402 and other vehicles.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of generating an overhead view of a tow vehicle and a trailer attached to the tow vehicle, the method comprising:
receiving, at a processing hardware, first sensor system data from a sensor system in communication with the processing hardware, the first sensor system data associated with a first trailer position with respect to the tow vehicle;
determining, at the processing hardware, a trailer width based on the first sensor system data;
receiving, at the processing hardware, second sensor system data from the sensor system, the second sensor system data associated with a second trailer position with respect to the tow vehicle;
determining, at the processing hardware, a trailer length based on the second sensor data;
determining, at the processing hardware, a separation distance between the trailer and the tow vehicle based on the first sensor system data and/or the second sensor system data;
retrieving from hardware memory in communication with the processing hardware, a vehicle length and a vehicle width;
generating, at the processing hardware, an overhead image including a vehicle representation and a trailer representation based on the trailer width, the trailer length, the separation distance, the vehicle length, and the vehicle width; and
transmitting, from the processing hardware to a display in communication with the processing hardware, instructions to display the overhead image.

2. The method of claim 1, wherein the sensor system includes at least one of a sensor and a camera.

3. The method of claim 1, further comprising:
receiving, at the processing hardware, a steering wheel angle from a steering wheel angle input device in communication with the processing hardware; and
adjusting, at the processing hardware, the overhead image based on the steering wheel angle.

4. The method of claim 1, further comprising:
receiving, at the processing hardware, a steering wheel angle from a steering wheel angle input device in communication with the processing hardware;
determining, at the processing hardware, a position of the trailer representation based the steering wheel angle; and
generating, at the processing hardware, an updated overhead image including the vehicle representation, the trailer representation, and a projected trailer representation, the projected trailer representation indicative of the position of the trailer at the steering wheel angle.

5. A method of generating an overhead view of a tow vehicle and a trailer attached to the tow vehicle, the method comprising:
receiving, at a processing hardware, a first image from a camera positioned on a rear end of the tow vehicle for capturing a rear environment of the tow vehicle, the first image including a front end of the trailer;
determining, at the processing hardware, a trailer width based on the first image;
receiving, at the processing hardware, a second image from the camera, the second image including a side of the trailer and the front end;
determining, at the processing hardware, a trailer length based on the second image;

receiving, at the processing hardware, sensor information from one or more sensors positioned on the rear end of the tow vehicle;

determining, at the processing hardware, a separation distance between the trailer and the tow vehicle based on the sensor information;

retrieving from hardware memory in communication with the processing hardware, a vehicle length and a vehicle width;

generating, at the processing hardware, an overhead image including a vehicle representation and a trailer representation based on the trailer width, the trailer length, the separation distance, the vehicle length, and the vehicle width; and transmitting, from the processing hardware to a display in communication with the processing hardware, instructions to display the overhead image.

6. The method of claim 5, wherein the vehicle representation and the trailer representation are proportional to the tow vehicle and the trailer respectively.

7. The method of claim 5, further comprising:
receiving, at the processing hardware, a steering wheel angle from a steering wheel angle input device in communication with the processing hardware; and
adjusting, at the processing hardware, the overhead image based on the steering wheel angle.

8. The method of claim 5, further comprising:
receiving, at the processing hardware, a steering wheel angle from a steering wheel angle input device in communication with the processing hardware; and
determining, at the processing hardware, a position of the trailer representation based the steering wheel angle; and
generating, at the processing hardware, an updated overhead image including the vehicle representation, the trailer representation, and a projected trailer representation, the projected trailer representation indicative of the position of the trailer at the steering wheel angle.

9. The method of claim 5, wherein the camera captures the first image when the tow vehicle and the trailer are at a first position and the second image when the tow vehicle and the trailer are at a second position.

10. The method of claim 5, wherein determining the separation distance includes calculating an elapsed time for a sensor signal to travel from the one or more sensors and back to the one or more sensors.

11. The method of claim 5, further comprising:
receiving, at the processing hardware, vehicle sensor data from one or more vehicles in communication with the processing hardware by way of a network; and
generating, at the processing hardware, the overhead image based on the trailer width, the trailer length, the separation distance, the vehicle length, the vehicle width, and the vehicle sensor data.

12. The method of claim 11, wherein the network is configured to provide vehicle-to-vehicle communication between the processing hardware and other vehicles.

13. A system for generating an overhead view of a tow vehicle and a trailer attached to the tow vehicle, the system comprising:
a driver display;
processing hardware in communication with the driver display;
hardware memory in communication with the processing hardware, the hardware memory storing instructions that when executed cause the processing hardware to execute a method, the method includes:
receiving a first image from a camera positioned on a rear end of the tow vehicle for capturing a rear environment of the tow vehicle, the first image including a front end of the trailer;
determining a trailer width based on the first image;
receiving a second image from the camera, the second image including a side of the trailer and the front end;
determining a trailer length based on the second image;
receiving sensor data from one or more sensors positioned on the rear end of the tow vehicle;
determining a separation distance between the trailer and the tow vehicle based on the sensor data;
retrieving from the hardware memory, a vehicle length and a vehicle width;
generating an overhead image including a vehicle representation and a trailer representation based on the trailer width, the trailer length, the separation distance, the vehicle length, and the vehicle width; and
transmitting to the driver display, instructions to display the overhead image.

14. The system of claim 13, wherein the vehicle representation and the trailer representation are proportional to the tow vehicle and the trailer respectively.

15. The system of claim 13, wherein the method further comprises:
receiving a steering wheel angle from a steering wheel angle input device in communication with the processing hardware; and
adjusting the overhead image based on the steering wheel angle.

16. The system of claim 13, wherein the method further comprises:
receiving a steering wheel angle from a steering wheel angle input device in communication with the processing hardware;
determining a position of the trailer representation based the steering wheel angle; and
generating an updated overhead image including the vehicle representation, the trailer representation, and a projected trailer representation, the projected trailer representation indicative of the position of the trailer at the steering wheel angle.

17. The system of claim 13, wherein the camera captures the first image when the tow vehicle and the trailer are at a first position and the second image when the tow vehicle and the trailer are at a second position.

18. The system of claim 13, wherein determining the separation distance includes calculating an elapsed time for a sensor signal to travel from the one or more sensors and back to the one or more sensors.

19. The system of claim 13, wherein the method further comprises:
receiving vehicle sensor data from one or more vehicles in communication with the processing hardware by way of a network; and
generating the overhead image based on the trailer width, the trailer length, the separation distance, the vehicle length, the vehicle width, and the vehicle sensor data.

20. The system of claim 19, wherein the network is configured to provide vehicle-to-vehicle communication between the processing hardware and other vehicles.

* * * * *